Jan. 21, 1958 J. J. ZIMMERMAN 2,820,450
ICE AND SNOW REMOVING MACHINE
Filed June 22, 1955 2 Sheets-Sheet 1
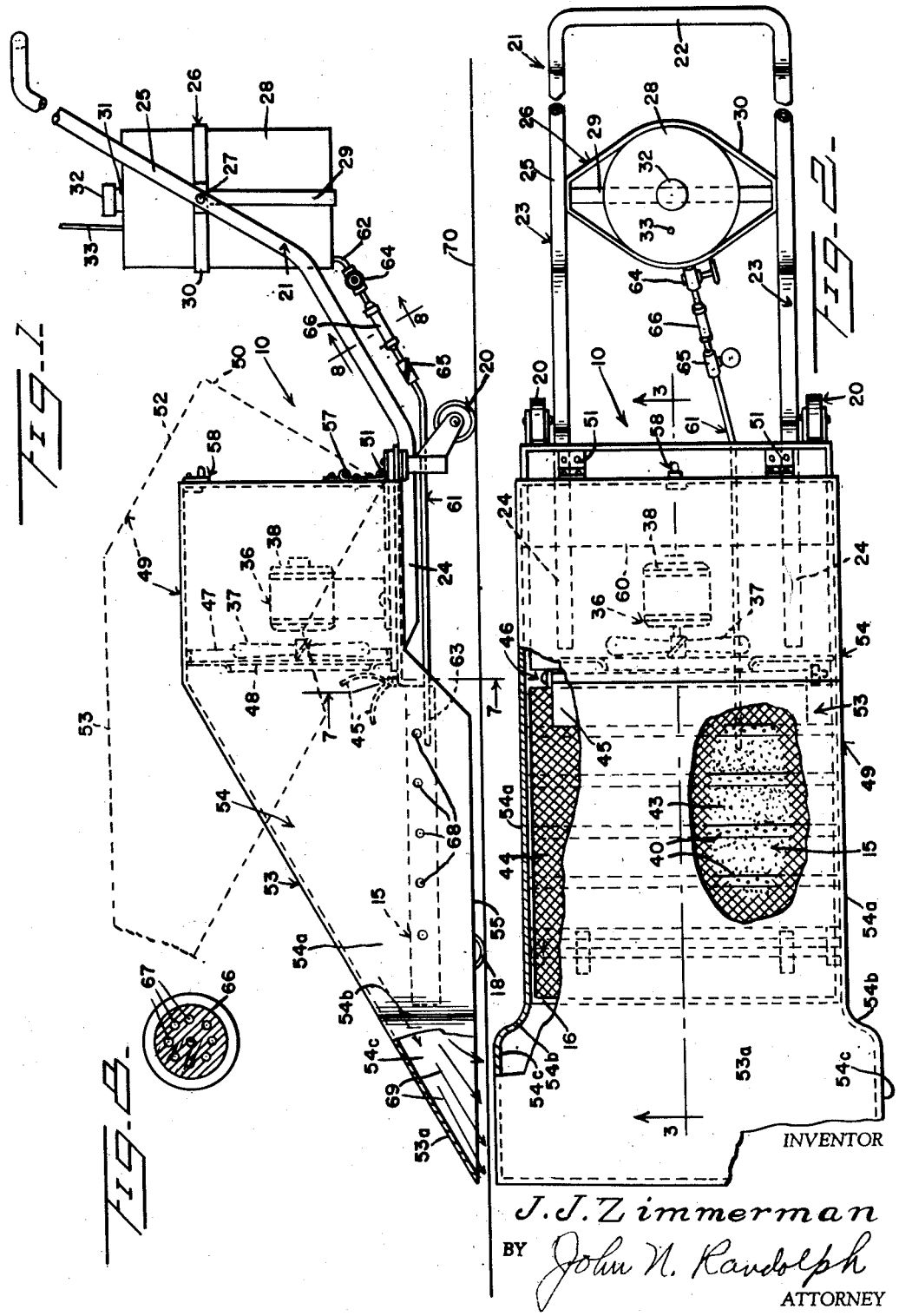
INVENTOR
J. J. Zimmerman
BY John N. Randolph
ATTORNEY

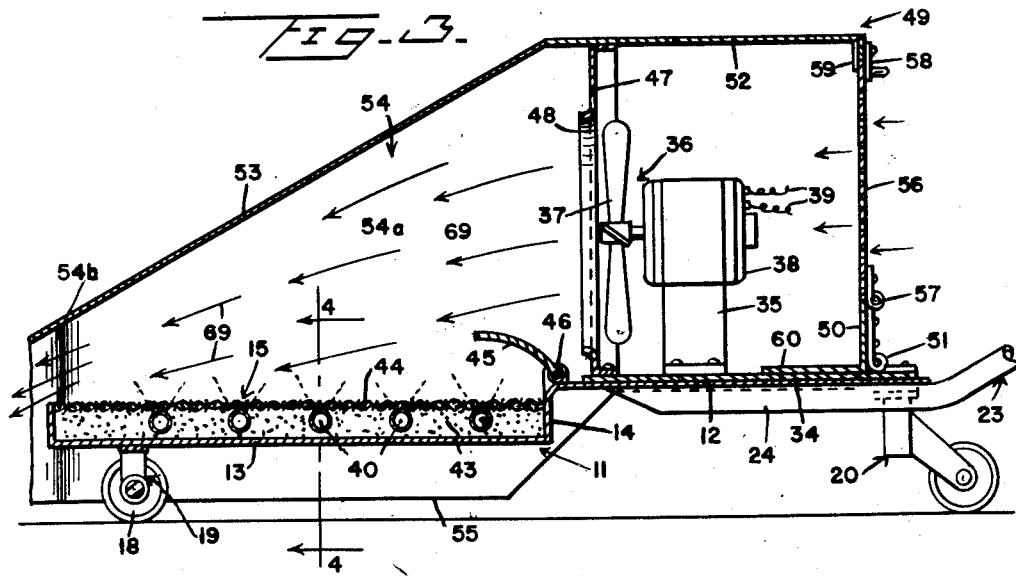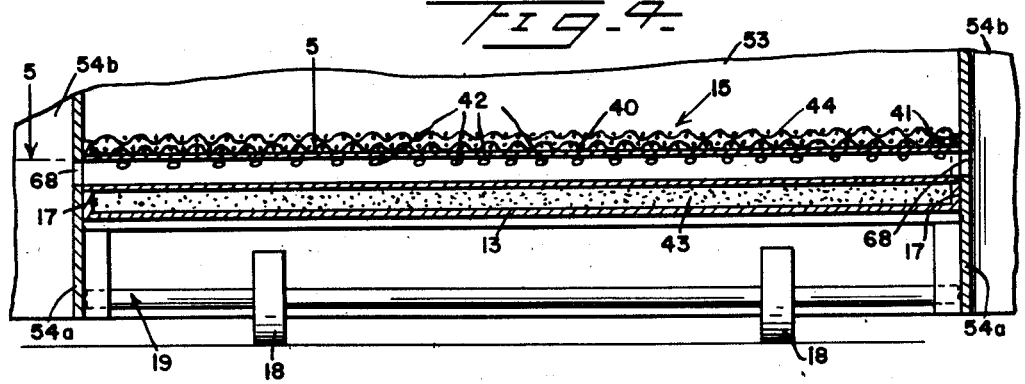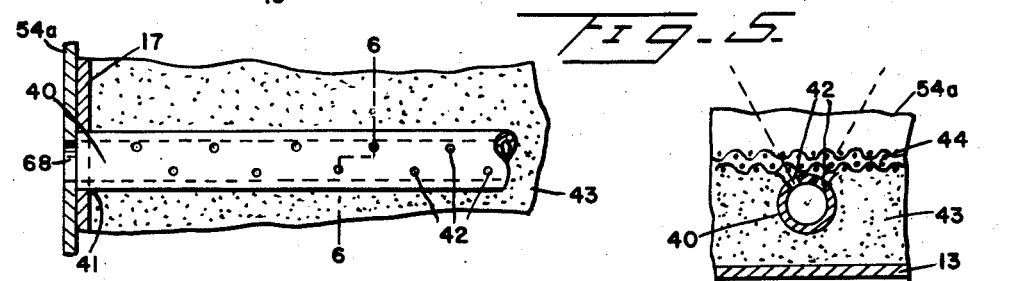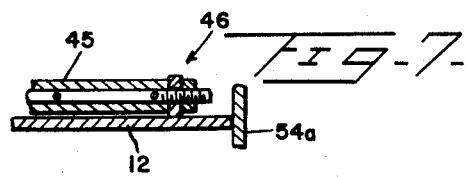

United States Patent Office 2,820,450
Patented Jan. 21, 1958

2,820,450
ICE AND SNOW REMOVING MACHINE
James J. Zimmerman, Kansas City, Mo.
Application June 22, 1955, Serial No. 517,149
5 Claims. (Cl. 126—271.2)

This invention relates to a machine for melting ice and snow and is adapted for use on sidewalks, driveways, roadways and elsewhere for melting and thus removing accumulations of ice and snow.

More particularly, it is an aim of the present invention to provide a suitably propelled machine having a wheeled frame equipped with a burner unit for supplying heat and a blower unit and deflector means for directing the hot air and products of combustion toward surfaces containing accumulations of ice and snow for quickly and effectively melting the ice and snow.

A further object of the invention is to provide such a machine of extremely simple construction which may be very economically manufactured and sold, and which will be safe, efficient and durable.

Various other objects and advantages of the invention will hereinafter become more fully apparent from the following description of the drawings, illustrating a presently preferred embodiment thereof, and wherein:

Figure 1 is a fragmentary side elevational view, partly in longitudinal section of the machine;

Figure 2 is a fragmentary top plan view, partly broken away, thereof;

Figure 3 is an enlarged fragmentary longitudinal sectional view taken substantially along a plane as indicated by the line 3—3 of Figure 2;

Figure 4 is an enlarged cross sectional view, taken substantially along a plane as indicated by the line 4—4 of Figure 3;

Figure 5 is an enlarged fragmentary horizontal sectional view, taken substantially along a plane as indicated by the line 5—5 of Figure 4;

Figure 6 is a fragmentary vertical sectional view taken substantially along a plane as indicated by the line 6—6 of Figure 5;

Figure 7 is an enlarged detailed cross sectional view taken substantially along a plane as indicated by the line 7—7 of Figure 1, and Figure 8 is an enlarged detailed cross sectional view, taken substantially along a plane as indicated by the line 8—8 of Figure 1.

Referring more specifically to the drawings, the ice and snow melting machine in its entirety and comprising the invention is designated generally 10 and includes an elongated, relatively wide plate 11 which extends longitudinally of the machine 10. The plate 11 has a rear portion 12 which is upwardly offset relative to a forward portion 13 of said plate. The portions 12 and 13 are connected by a vertically disposed transversely extending intermediate portion 14 of the plate. The forward plate portion 13 comprises the bottom of an elongated relatively wide pan or open top receptacle, designated generally 15 which is relatively shallow. The plate portion or bottom 13 has an upturned forward end portion or front wall 16 and upturned side edge portions forming side walls 17 of said pan 15. The inner or rear end wall of the pan 15 is formed by the portion 14.

The machine 10 is provided with a pair of transversely spaced front ground engaging wheels 18 which are supported beneath the pan 15, adjacent its forward end, by suitable journal means 19 which are secured to and depend from the pan bottom 13. The machine 10 is also provided with a pair of rear caster wheels 20 which are connected to and depend from the rear corners of the rear plate portion 12.

In the embodiment of the machine 10 as illustrated, a handle 21 is provided by means of which the machine 10 can be manually pushed. However, as the description proceeds, it will be understood that the machine may be made in various sizes and could be otherwise suitably propelled. The handle 21 includes a transversely extending grip portion 22 and downwardly and forwardly extending corresponding arms 23 which terminate in complementary straight terminal portions 24 which are disposed in spaced apart, substantially parallel relation to one another. The terminal portions 24 are disposed beneath the rear frame portion 12 and are suitably secured thereto. The legs 23 extend upwardly and rearwardly from their terminal portions 24, behind the rear frame portion 12, so that the handgrip portion 22 is positioned substantially to the rear of the frame portion 12 and at a suitable level to be conveniently gripped by the operator in a standing position for propelling the machine 10 forwardly or from right to left as seen in Figures 1 and 2.

The arms 23 include portions 25 which are disposed between and spaced from the handgrip 22 and said terminal portions 24 and which provide supports for a sling, designated generally 26, which is suitably secured by fastenings 27 to the arm portions 25. A storage tank 28 for liquid fuel is supported in the sling 26 which includes a part 29 which engages under the bottom of the tank 28 and a part 30 which engages around the tank, substantially above the bottom thereof. The tank 28 has a filling neck 31 extending upwardly from the top thereof and which is normally closed by a cap 32. A gauge rod 33, attached to a float (not shown) contained within the tank 28, extends slidably through the top of said tank.

A base plate or platform 34 is mounted on and suitably secured to the upper side of the rear plate portion 12. A stand 35 is fixed to and rises from the plate 34 and supports a blower, designated generally 36. The blower 36 preferably comprises a multibladed fan 37 and a motor 38 for driving said fan and which is disposed behind the fan. The motor 38 may be of any suitable type and is here illustrated as an electric motor which may be supplied with electric current through the wiring 39 from any suitable source.

A plurality of tubes 40 are supported in the pan 15 and extend transversely thereof. The tubes 40 have end portions which are secured in openings 41 of the side walls 17, as best seen in Figures 4 and 5, and are thus supported substantially above the bottom 13 and beneath and adjacent the open top of the pan 15. The tubes 40 are disposed in longitudinally spaced relation to one another and are each provided with a series of apertures 42 in upper portions thereof, as best illustrated in Figures 5 and 6. The pan 15 contains a filling or mass of a wicklike material 43 such as asbestos preferably in a loose finely divided form. The open top of the pan is preferably covered with mesh wire fabric or hardware cloth 44 for retaining the material 43 therein and toward which the apertures 42 open, as seen in Figure 6.

An adjustable deflector 45 extends across the forward end of the rear plate portion 12 and is pivotally mounted at its rear longitudinal edge by a pivot means 46, as best seen in Figure 7, arranged to permit the deflector 45 to be swung upwardly and rearwardly away from the rear portion of the pan 15 or downwardly and forwardly over the rear pan portion. The mounting means 46 of the deflector 45 may be tightened for retaining said deflector in different adjusted positions relative to the pan 15. A baffle 47 is secured to the plate 34 and is disposed in an upright position relative thereto, between said deflector 45 and the fan 37, and has a flanged opening 48 which is disposed directly in front of the fan 37 and the flange of which extends forwardly and away from the fan.

A hood or cover 49, having an open bottom, is disposed over the plate 11 and parts supported thereon including the blower 36 and baffle 47. Said hood 49 has a rear wall 50 the lower end of which is connected by hinges 51 to the rear portion of the plate 34. The hood or cover 49 includes a rear top wall portion 52 which extends forwardly from the upper end of the rear wall 50 and which is disposed above and substantially parallel to the plate portion 12. The hood has a downwardly and forwardly inclined forward top wall portion 53 which extends from the forward end of the rear top wall portion 52 and the forward end of which terminates substantially in advance of and below the level of the forward end of the pan 15, as seen in Figure 1. The hood 49 also includes corresponding side walls 54, rear portions of which closely embrace and terminate adjacent the level of the rear plate portion 12 and intermediate portions 54a of which closely embrace the side walls 17 of the pan 15. The side walls 54 also include forward end portions 54c which are offset outwardly relative to the portions 54a by outwardly flared portions 54b of the walls 54, which are located adjacent the forward end of the pan 15, as best seen in Figure 2. Thus, the forward end of the inclined top wall portion 53, which extends between the side wall portions 54b and 54c is widened relatively to the remainder of said top wall portion 53, as illustrated in Figure 2 and as indicated at 53a. The side wall portions 54a, 54b and 54c extend downwardly to substantially below the pan 15 and have substantially coplanar bottom edges 55 which are disposed in the same plane as the forward end of the wall portion 53a and only slightly above the level of the bottom portion of the wheels 18 and 20.

The rear wall 50 is provided with a relatively large apertured door 56 which is swingably mounted at its bottom edge by hinges 57 to swing outwardly and downwardly to afford access to the blower 36. The door 56 is held in a closed position by a latch means 58. A stop 59 is fixed to and extends downwardly from the upper portion of the inner side of the wall 50 to prevent the door 56 from swinging inwardly past a closed position in the plane of the rear wall 50. The rear wall 50 is preferably provided at its bottom edge with an inturned forwardly extending flange 60 which rests on the rear portion of the plate 34 when the hood is in a closed position as seen in Figure 3 to provide a brace for said hood. The hood may be additionally braced in its closed position by its top wall portion 52 resting on the upper end of the baffle 47, as seen in Figure 3. It will be readily apparent that the hood 49 can be swung upwardly and rearwardly to its open dotted line position of Figure 1 on the hinges 51 for exposing the pan 15 and blower 36.

A fuel supply conduit 61 has an inlet end 62 opening upwardly into the tank 28 through the bottom thereof and a forward discharge end 63 which extends through the rear pan wall 14 and opens into the pan near the bottom thereof. The conduit 61, near its inlet end 62, is provided with a manually operated shutoff valve 64, and said conduit 61 is provided with a regulating valve 65 which is disposed between the valve 64 and the outlet end 63, and preferably adjacent the valve 64. The conduit 61 is also provided with a firewall or back blast preventor 66 which is interposed between the valves 64 and 65. The device 66 is of larger cross sectional size than the remainder of the conduit 61 and as best seen in Figure 8 is of solid construction except for a series of bores 67 of small diameter which extend longitudinally therethrough. The combined capacities of the bores 67 are adequate to supply a maximum amount of fuel to the pan 15. Said bores individually are of such small cross sectional size that should a back blast occur through the supply conduit 61 the flame would be extinguished in the bores 67 and thus prevented from reaching the storage tank 28.

The side wall portions 54a of the hood 49 are provided with openings 68 which register with the ends of the tubes 40, as seen in Figures 4 and 5, when the hood is in a closed position.

After the regulating valve 65 has been properly adjusted to permit a supply of a proper amount of fuel to the pan 15 for maintaining the wick material 43 properly saturated so that the burner will supply a desired amount of heat, the adjustment of said regulating valve 65 does not thereafter have to be changed. Assuming that the liquid fuel such as gasoline is contained in the storage tank 28, when it is desired to use the machine 10, the shutoff valve 64 is manually opened to supply fuel by gravity to the pan 15. Thereafter, the hood 49 can be raised to its dotted line position of Figure 1 to expose the pan or burner 15 so that the fuel therein can be ignited, after which the hood 49 is returned to its closed position of Figure 3. The blower 36 is then placed in operation and the blades or vanes of the fan 37 thereof are pitched so that air will be drawn into the machine through the apertures of the door 56 and will be propelled by the blower, as illustrated by the arrows 69 of Figures 1 and 3, forwardly through the baffle opening 48 over the burner 15. The blast of air from the blower 36 will be deflected downwardly and forwardly by the inclined hood portion 53 so that the air, which is heated in passing over the burner, will be discharged downwardly and forwardly as seen in Figure 1 through the forward end of the open bottom of the hood 49 onto the surface 70 on which the wheels 18 and 20 engage. The deflector 45 is adjusted so that the blast of air from the blower 36 will not be directed downwardly toward the burner 15 and which might result in extinguishing the flame therein. The air from the blower passing over the burner 15 will create a suction so that air will be drawn inwardly through the openings 68 into the tubes 40 and upwardly through the apertures 42 of said tubes for supplying the necessary oxygen to the burner 15. The wall portions 54c are outwardly offset sufficiently from the wall portions 54a and extend upwardly a sufficient distance above the level of the openings 68, so that when the machine 10 is operating in deep snow the parts 53a and 54a will cut a path of sufficient width in the snow so that the walls of snow thus formed on either side of the machine will be spaced outwardly a sufficient distance from the side wall portions 54a so that adequate air can enter through the openings 68 to supply the necessary oxygen to the burner 15.

It will be readily apparent that the hood surface 53 will be heated to a considerable extent by the burner 15. Accordingly, while the machine 10 is thus in operation and is being propelled or pushed forwardly from right to left as seen in Figures 1 and 2, if the surface 70 in advance of the machine is covered with snow to any appreciable depth, the hood surfaces 53a and 53 will function as a shovel up which the snow will be deflected. As these surfaces 53 and 53a are heated to a high temperature by the burner 15 disposed therebeneath, the snow thus deflected upwardly thereon will be quickly melted. The ice or snow over which the forward end of the hood surface 53a passes will be melted immediately by the blast of hot air which is directed downwardly thereon, as previously described. Thus, the surface 70 over which the machine 10 is propelled will be readily cleared of any ice, snow or other frozen accumulation thereon.

Obviously, the machine 10 may be made in various sizes and various other modifications and changes are contemplated and may obviously be resorted to, without departing from the spirit or scope of the invention as hereinafter defined by the appended claims.

I claim as my invention:

1. An ice and snow melting machine of the character described comprising an elongated frame having a forward end and a rear end, ground engaging supporting wheels connected to and disposed beneath the end portions of said frame, the forward end portion of said frame defining an elongated upwardly opening burner pan extending the width of the frame and from the forward end thereof to near the rear end of the frame, means for supplying fuel by gravity to the burner, a blower supported on the rear portion of said frame for directing a blast of air forwardly over the burner, and a hood having an open bottom disposed over said frame and blower and including a downwardly and forwardly inclined top wall portion disposed over said burner and toward which the air is directed for deflecting the air supplied by the blower and heated by the burner downwardly and forwardly through the open bottom of the hood in advance of said burner, said inclined top portion of the hood having a rear part disposed above and spaced from the open top of said burner and having a forward end terminating substantially beyond the forward end of the burner and below the level thereof and adjacent the level of the bottommost portions of said wheels, and said hood having side wall portions extending downwardly from the side edges of said inclined portion and closely embracing the side walls of the burner and having bottom edges terminating substantially coplanar with said forward end of the inclined hood portion, said burner including apertured tubes extending across the pan thereof and having ends supported in and opening through side walls of the burner pan, said side walls of the hood having openings registering with the ends of said tubes for supplying oxygen to the burner.

2. A machine as in claim 1, said hood being hingedly mounted at its rear end on said rear frame portion behind and spaced from the blower for swinging movement upwardly and rearwardly to an exposed position.

3. A machine as in claim 2, said hood including a rear wall having an apertured hinged closure.

4. An ice and snow melting machine of the character described comprising an elongated frame having a forward end and a rear end, ground engaging supporting wheels connected to and disposed beneath the end portions of said frame, the forward portion of said frame defining an elongated upwardly opening burner pan extending the width of the frame and from the forward end thereof to near the rear end of the frame, means for supplying fuel by gravity to the burner, a blower supported on the rear portion of said frame for directing a blast of air forwardly over the burner, and a hood having an open bottom disposed over said frame and blower and including a downwardly and forwardly inclined top wall portion disposed over said burner and toward which the air is directed for deflecting the air supplied by the blower and heated by the burner downwardly and forwardly through the open bottom of the hood in advance of said burner, a baffle mounted on the rear frame portion between the burner and blower, said hood including an apertured rear wall, and hinge means hingedly connecting the lower end of said rear wall to the rear frame portion, rearwardly of said blower, said hood including a top portion disposed to rest on an upper portion of said baffle, and said hood being swingable upwardly and rearwardly for exposing the burner and blower.

5. An ice and snow melting machine of the character described comprising an elongated frame having a forward end and a rear end, ground engaging supporting wheels connected to and disposed beneath the end portions of said frame, the forward portion of said frame defining an elongated upwardly opening burner pan extending the width of the frame and from the forward end thereof to near the rear end of the frame, means for supplying fuel by gravity to the burner, a blower supported on the rear portion of said frame for directing a blast of air forwardly over the burner, and a hood having an open bottom disposed over said frame and blower and including a downwardly and forwardly inclined top wall portion disposed over said burner and toward which the air is directed for deflecting the air supplied by the blower and heated by the burner downwardly and forwardly through the open bottom of the hood in advance of said burner, said inclined top portion of the hood having a rear part disposed above and spaced from the open top of said burner and having a forward end terminating substantially beyond the forward end of the burner and below the level thereof and adjacent the level of the bottommost portions of said wheels, and said hood having side wall portions extending downwardly from the side edges of said inclined portion and closely embracing the side walls of the burner and having bottom edges terminating substantially coplanar with said forward end of the inclined hood portion, said burner including apertured tubes extending across the pan thereof and having ends supported in and opening through side walls of the burner pan, and said side walls of the hood having openings registering with the ends of said tubes for supplying oxygen to the burner, said forward end of the inclined top portion of the hood being of greater width than the rear part of said top portion of the hood and said side walls including forward portions depending from said forward part of the inclined top portion and outwardly offset relative to the side wall portions in which said openings are provided for cutting a path through snow of a width substantially greater than the spacing between the side wall portions provided with the openings to prevent sealing of the openings by walls of snow on either side of the machine.

References Cited in the file of this patent

UNITED STATES PATENTS

| | | |
|---|---|---|
| 472,831 | Steel | Apr. 12, 1892 |
| 1,026,026 | Engebritson | May 14, 1912 |
| 1,284,873 | Burns | Nov. 12, 1918 |
| 1,921,901 | Anderson | Aug. 8, 1933 |
| 2,086,639 | Rees | July 13, 1937 |
| 2,190,349 | Beam | Feb. 13, 1940 |
| 2,261,006 | Sweeney | Oct. 28, 1941 |
| 2,618,322 | Conta | Nov. 18, 1952 |